(12) United States Patent
Tseng et al.

(10) Patent No.: US 11,809,262 B2
(45) Date of Patent: Nov. 7, 2023

(54) POWER ADJUSTMENT CIRCUIT, ADJUSTABLE POWER SUPPLY SYSTEM AND ADJUSTABLE POWER SUPPLY METHOD

(71) Applicant: YOUNGTEK ELECTRONICS CORPORATION, Hsinchu (TW)

(72) Inventors: Ching-Yung Tseng, Hsinchu (TW); Yong-Da Weng, Hsinchu (TW); Ping-Lung Wang, Hsinchu (TW)

(73) Assignee: YOUNGTEK ELECTRONICS CORPORATION, Hsinchu (TW)

( * ) Notice: Subject to any disclaimer, the term of this patent is extended or adjusted under 35 U.S.C. 154(b) by 355 days.

(21) Appl. No.: 17/383,636

(22) Filed: Jul. 23, 2021

(65) Prior Publication Data

US 2022/0155845 A1 May 19, 2022

(30) Foreign Application Priority Data

Nov. 18, 2020 (TW) ................ 109140215

(51) Int. Cl.
*G06F 1/329* (2019.01)
*G06F 1/3296* (2019.01)
*G06F 1/3206* (2019.01)
*G06F 1/20* (2006.01)

(52) U.S. Cl.
CPC ............ *G06F 1/3296* (2013.01); *G06F 1/206* (2013.01); *G06F 1/3206* (2013.01)

(58) Field of Classification Search
CPC ....... G06F 1/3296; G06F 1/206; G06F 1/3206
See application file for complete search history.

(56) References Cited

U.S. PATENT DOCUMENTS

| | | | | |
|---|---|---|---|---|
| 2006/0002161 A1* | 1/2006 | Dangelo | ............ | G01R 31/2863 363/147 |
| 2009/0300377 A1* | 12/2009 | Kao | .................... | G06F 3/04847 713/300 |
| 2010/0007998 A1* | 1/2010 | Dishman | .................. | H02H 3/42 361/18 |
| 2012/0011377 A1* | 1/2012 | Yu | ........................... | G06F 1/206 713/300 |

(Continued)

FOREIGN PATENT DOCUMENTS

TW 201034334 A1 9/2010
TW 201036333 A1 10/2010

(Continued)

*Primary Examiner* — Rafael O De Leon Domenech
(74) *Attorney, Agent, or Firm* — Li & Cai Intellectual Property (USA) Office (57) ABSTRACT

A power adjustment circuit, an adjustable power supply system and an adjustable power supply method are provided. The adjustable power supply system includes a power module, a device power supply, and a control circuit. The device power supply provides a supplied power to a device to be tested according to an operating voltage. The control circuit outputs an adjustment signal to the power module according to a power consumption status of the device to be tested. The power module generates the operating voltage according to the adjustment signal, and allows a first power dissipation generated by the device power supply to be less than a predetermined power.

16 Claims, 4 Drawing Sheets

(56) References Cited

U.S. PATENT DOCUMENTS

| | | | | |
|---|---|---|---|---|
| 2012/0131363 A1* | 5/2012 | Hsu | ........................ | G05D 23/19 |
| | | | | 713/320 |
| 2014/0191742 A1* | 7/2014 | Kung | .................... | H02M 3/156 |
| | | | | 323/282 |
| 2014/0327414 A1* | 11/2014 | Persson | .................... | H02M 1/32 |
| | | | | 323/234 |
| 2018/0275704 A1* | 9/2018 | Li | ........................... | G05F 1/573 |

FOREIGN PATENT DOCUMENTS

| | | |
|---|---|---|
| TW | 201312335 A1 | 3/2013 |
| TW | 201424229 A | 6/2014 |

* cited by examiner

POWER ADJUSTMENT CIRCUIT, ADJUSTABLE POWER SUPPLY SYSTEM AND ADJUSTABLE POWER SUPPLY METHOD

CROSS-REFERENCE TO RELATED PATENT APPLICATION

This application claims the benefit of priority to Taiwan Patent Application No. 109140215, filed on Nov. 18, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power supply device, and more particularly to a power adjustment circuit, an adjustable power supply system, and an adjustable power supply method.

BACKGROUND OF THE DISCLOSURE

Figure 1:
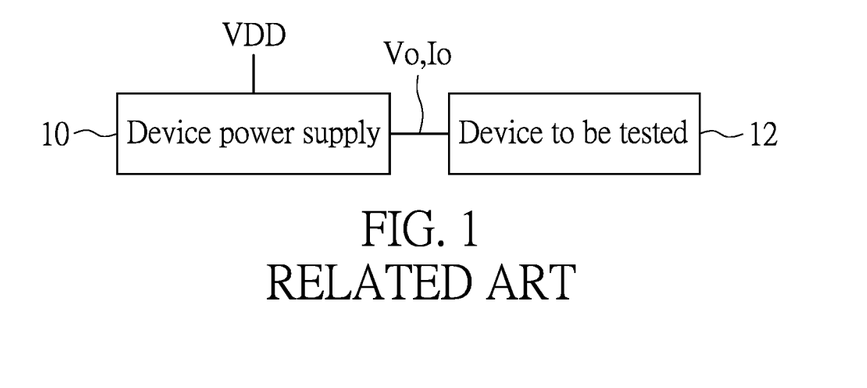
FIG. 1 is a schematic view of a power supply of a device to be tested.

Reference is made to FIG. 1, in which a power supply of a device to be tested is shown. A maximum power dissipation that a conventional device power supply 10 shown in FIG. 1 can sustain is generally about 10 W. However, in order to meet a high current requirement of a device to be tested 12, an operating voltage VDD of the device power supply 10 can be set at 10 V, and the device power supply 10 can be arranged to stably provide a supplied voltage of −1 V to 7 V and a supplied current of 0.7 A to the device to be tested 12. Although the device power supply 10 can sustain a certain amount of power dissipation, a temperature of the device power supply 10 increases as the power dissipation of the device power supply 10 increases. Therefore, the device power supply 10 must be cooled through a heat dissipation structure.

The high current requirement of the device to be tested 12 can be achieved, for example, by having the supplied current of 1 A provided to the device to be tested 12 from the device power supply 10, and by having the supplied voltage provided to the device to be tested 12 from the device power supply 10 reduced to a range from 0 V to 3.7 V, so that the device power supply 10 can be effectively cooled through the current heat dissipation structure. However, due to limitations of the heat dissipation structure, the conventional device power supply 10 cannot simultaneously meet high voltage or high current requirements of different devices to be tested.

SUMMARY OF THE DISCLOSURE

In response to the above-referenced technical inadequacies, the present disclosure provides a power adjustment circuit, an adjustable power supply system and an adjustable power supply method, in which a power supply of a device power supply can be automatically controlled according to a power consumption status of a device to be tested.

In one aspect, the present disclosure provides an adjustable power supply system, which includes a power module, a device power supply, and a control circuit. The device power supply is electrically connected to the power module, and provides a supplied power to a device to be tested according to an operating voltage. The control circuit outputs an adjustment signal according to a power consumption status of the device to be tested, so that the power module generates the operating voltage according to the adjustment signal, and the device power supply generates a first power dissipation that is less than a predetermined power.

In another aspect, the present disclosure provides a power adjustment circuit for power control of a power module and a device power supply. The power module provides an operating voltage to the device power supply, and the device power supply performs a power supply operation and provides a supplied power to a device to be tested according to the operating voltage. The power adjustment circuit includes a detection circuit and a control circuit. The detection circuit detects a power consumption status of the device to be tested and outputs a power detection result. The control circuit is electrically connected to the detection circuit. The control circuit outputs an adjustment signal to the power module according to the power detection result, so that the power module generates the operating voltage according to the adjustment signal, and the device power supply generates a first power dissipation that is less than a predetermined power. The control circuit calculates and obtains a second power dissipation of the device to be tested and the first power dissipation of the device power supply according to the power detection result, and, the control circuit outputs the adjustment signal when the first power dissipation is greater than the predetermined power.

In yet another aspect, the present disclosure provides an adjustable power supply method for power control of a power module and a device power supply by a control circuit. The adjustable power supply method includes: detecting a power consumption status of the device to be tested by the control circuit when the device power supply provides a supplied power to the device to be tested, in which the device power supply performs power supply operation according to an operating voltage provided by the power module; and outputting an adjustment signal to the power module according to a detection result by the control circuit, so that the power module generates the operating voltage according to the adjustment signal, and the device power supply generates a first power dissipation that is less than a predetermined power.

Therefore, in the power adjustment circuit, the adjustable power supply system and the adjustable power supply method provided by the present disclosure, the power dissipation of the device power supply can be automatically adjusted according to the power consumption status of the device to be tested, so that the device power supply can stably provide high voltage and high current to meet power requirements of different devices to be tested, and a burden of heat dissipation can be effectively reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way.

Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiments of the present disclosure provide a power adjustment circuit, an adjustable power supply system and an adjustable power supply method. Through detecting a power dissipation at a load end, a power dissipation of a device power supply currently provided for the load end can be further obtained according to a detection result. Moreover, the power dissipation of the device power supply can be actively reduced through an adjustment mechanism, so that the device power supply can operate stably and a burden of heat dissipation can be reduced. In addition, the device power supply can provide a high voltage output and a high current output to meet power requirements of different devices to be tested.

Embodiment of Adjustable Power Supply System

Figure 2:
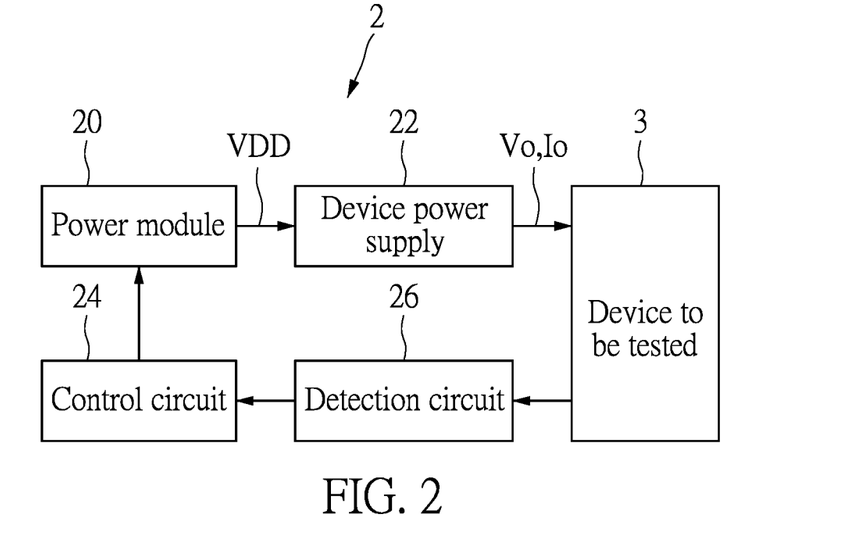
FIG. 2 is a functional block diagram of an adjustable power supply system according to one embodiment of the present disclosure.

Reference is made to FIG. 2, in which FIG. 2 is a functional block diagram of an adjustable power supply system according to one embodiment of the present disclosure. In the present embodiment, an adjustable power supply system 2 includes, for example but not limited to, a power module 20, a device power supply 22, a control circuit 24, and a detection circuit 26. An object that receives a power supply from the adjustable power supply system 2 described herein is exemplified as a device to be tested in a test system, but it is not limited thereto. The power module 20 is electrically connected to the device power supply 22. The device power supply 22 is electrically connected to a device to be tested 3. The detection circuit 26 is electrically connected to the device to be tested 3. The control circuit 24 is electrically connected to the detection circuit 26 and the power module 20.

Furthermore, the power module 20 can provide an operating voltage VDD to the device power supply 22, and the device power supply 22 performs power supply operation according to the operating voltage VDD. The device power supply 22 can provide different supplied power according to power requirements of different devices to be tested 3, respectively. For example, the supplied power provided by the device power supply 22 to the device to be tested 3 can be different supplied voltages Vo or supplied currents Io according to settings or operation. The specific power supply configuration of the device power supply 22 is known to those having ordinary skill in the art, and details thereof are not reiterated herein.

The control circuit 24 outputs an adjustment signal to the power module 20 according to a power consumption status of the device to be tested 3, and the adjustment signal is used to adjust the operating voltage VDD output from the power module 20 to the device power supply 22. For example, assuming that a power dissipation of the device power supply 22 is a first power dissipation, and a power dissipation of the device to be tested 3 is a second power dissipation, a sum of the first power dissipation and the second power dissipation is equal to a total power dissipation, and the total power dissipation is the operating voltage VDD of the device power supply 22 multiplied by the supplied current Io provided by the device power supply 22 to the device to be tested 3. Therefore, when the total power dissipation is fixed, and when the second power dissipation becomes smaller (i.e., the device to be tested 3 is lightly loaded), the first power dissipation becomes relatively larger. However, when the first power dissipation becomes too large, a temperature of the device power supply 22 may rise rapidly, or there can be an unstable operation due to exceeding the power dissipation that the device power supply 22 can handle. Accordingly, in the present embodiment, the control circuit 24 can control the power dissipation of the device power supply 22 to be within a reasonably safe range that is less than a predetermined power (e.g., a power that allows the device power supply 22 to operate stably) mainly through the adjustment signal, but the present disclosure is not limited thereto.

Specifically speaking, when the control circuit 24 recognizes that the power dissipation of the of the device power supply 22 is greater than the predetermined power according to the power consumption status of the device to be tested 3, the control circuit 24 outputs the adjustment signal to the power module 20, so that the power module 20 adjusts the operating voltage VDD provided to the device power supply 22 up or down according to the adjustment signal, thereby allowing the power dissipation of the device power supply 22 to be less than the predetermined power through the adjusted operating voltage VDD. Moreover, when the control circuit 24 recognizes that the power dissipation of the device power supply 22 is less than the predetermined power according to the power consumption status of the device to be tested 3, the control circuit 24 does not output the adjustment signal. That is, at this time, the device power supply 22 can operate normally.

In one embodiment, the control circuit 24 can obtain the power consumption status of the device to be tested 3 through the detection circuit 26. Here, the power consumption status refers to the power dissipation, voltage, or current of the device to be tested 3. For example, the control circuit 24 can obtain the supplied power of the device to be tested 3 through the detection circuit 26, and the control circuit 24 can calculate and obtain the power dissipation of the device to be tested 3 according to the supplied power. The detection circuit 26 can be, for example, a voltage detector, a current detector, or any combination thereof.

For example, the control circuit 24 can obtain the supplied power of the device to be tested 3 through the following ways. When the control circuit 24 recognizes that the device power supply 22 provides the supplied current Io to the device to be tested 3, the control circuit 24 can detect the supplied voltage Vo provided to the device to be tested 3 by the device power supply 22 through the voltage detector of the detection circuit 26. When the control circuit 24 recognizes that the device power supply 22 provides the supplied voltage Vo to the device to be tested 3, the control circuit 24 can detect the supplied current Io provided to the device to be tested 3 by the device power supply 22 through the current detector of the detection circuit 26. The control circuit 24 can also detect the supplied voltage Vo and the supplied current Io provided to the device to be tested 3 by the device power supply 22 through the voltage detector and the current detector of the detection circuit 26, respectively. Eventually, the control circuit 24 can determine the power dissipation of the device to be tested 3 according to a multiplication of the supplied voltage Vo and the supplied current Io.

Therefore, when the control circuit 24 obtains a power detection result of the device to be tested 3, the control circuit 24 can accordingly calculate the first power dissipation of the device power supply 22 and the second power dissipation of the device to be tested 3. The first power dissipation is calculated by, for example, subtracting the supplied voltage Vo provided to the device to be tested 3 by the device power supply 22 from the operating voltage VDD provided to the device power supply 22, so as to obtain a voltage difference. Then, the voltage difference is multiplied by the supplied current Io provided to the device to be tested 3 by the device power supply 22 to obtain the first power dissipation. In practice, the operating voltage VDD is greater than the supplied voltage Vo. The second power dissipation is calculated, for example, by a multiplication of the supplied voltage Vo and the supplied current Io provided to the device to be tested 3 by the device power supply 22. In the present disclosure, calculations of the first power dissipation and the second power dissipation are not limited to the above examples.

In addition, in one embodiment, the control circuit 24 and the detection circuit 26 can be used as the power adjustment circuit of the power module 20 and the device power supply 22. The control circuit 24 adjusts the power module 20 to provide the operating voltage VDD to the device power supply 22 according to a detection result of the detection circuit 26, so that the power dissipation of the device power supply 22 can be maintained within a predetermined power for normal operation according to the power consumption status of the device to be tested 3.

Embodiment of Adjustable Power Supply Method

Figure 3:
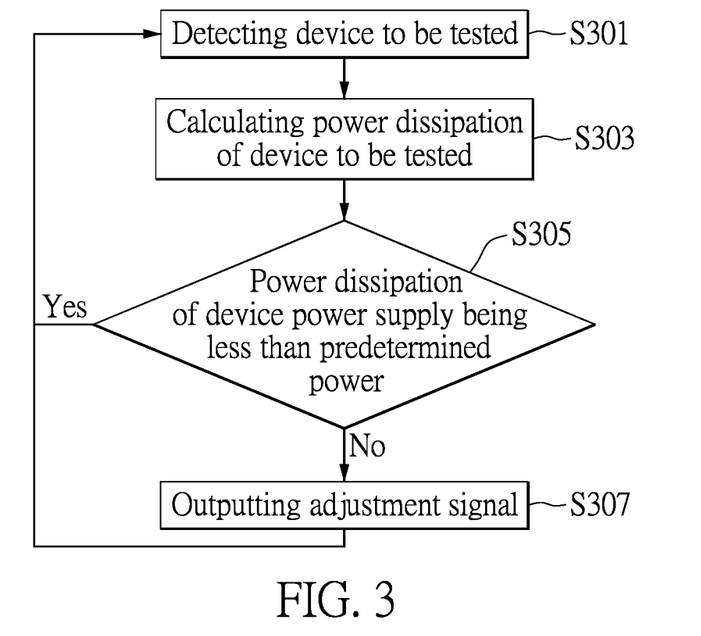
FIG. 3 is a flow chart of an adjustable power supply method according to one embodiment of the present disclosure.

Reference is made to FIG. 3, in which FIG. 3 is a flow chart of an adjustable power supply method according to one embodiment of the present disclosure. The flow chart shown in FIG. 3 is an example of the configuration of FIG. 2, but it is not limited thereto. The process shown in FIG. 3 includes the following steps.

Step S301: Detecting the device to be tested 3. The control circuit 24 controls the detection circuit 26 to detect the power consumption status of the device to be tested 3, so as to obtain the supplied voltage Vo or the supplied current Io provided to the device to be tested 3 by the device power supply 22.

Step S303: Calculating the power dissipation of the device to be tested 3. The control circuit 24 can calculate the current power dissipation of the device to be tested 3 according to a detection result of step S301.

Step S305: Determining whether or not the power dissipation of the device power supply 22 is less than a predetermined power. When the control circuit 24 obtains the power consumption of the device to be tested 3, the control circuit 24 can further calculate the power dissipation of the device power supply 22 according to the power dissipation of the device to be tested 3, and compare the power dissipation of the device power supply 22 with the predetermined power, so as to determine whether or not the power dissipation of the device power supply 22 is less than the predetermined power.

Step S307: Outputting an adjustment signal. When it is determined to be "No" in step S305, which indicates that the power dissipation of the device power supply 22 is greater than the predetermined power, the control circuit 24 outputs the adjustment signal to the power module 20, so that the power module 20 adjusts the operating voltage VDD provided to the device power supply 22 according to the adjustment signal. The adjustment method described herein is, for example, to adjust the operating voltage VDD to be higher or lower, so as to allow the power dissipation of the device power supply 22 to be less than the predetermined power according to the adjusted operating voltage VDD. When it is determined to be "Yes" in step S305, the process returns to step S301.

As described in the above embodiment, the control circuit 24 can recognize whether or not the power dissipation of the device power supply 22 is less than the predetermined power according to the detection result of the detection circuit 26. When the power dissipation of the device power supply 22 is greater than the predetermined power, the control circuit 24 outputs the adjustment signal, so that the power dissipation of the device power supply 22 is reduced to be less than the predetermined power through the power module 20.

It should be noted that, in another embodiment, the control circuit 24 can also adjust the power dissipation of the device power supply 22 by looking up a table, and an example thereof is provided below. Table 1 shows corresponding conditions of a detected voltage Vd and the operating voltage VDD, where the detected voltage Vd is the detection result of the detection circuit 26 detecting the supplied voltage Vo of the device to be tested 3, and the operating voltage VDD is the voltage used for the device power supply 22. At the same time, the device power supply 22 is assumed to provide a fixed current of 1.2 A as the supplied current Io for the device to be tested 3.

TABLE 1

| Vd  | 0 V  | 1 V  | 2 V  | 3 V  | 4 V  | 5 V  | 6 V  | 7 V  |
|-----|------|------|------|------|------|------|------|------|
| VDD | 3 V  | 4 V  | 5 V  | 6 V  | 7 V  | 8 V  | 9 V  | 10 V |
| Vd  | 8 V  | 9 V  | 10 V | 11 V | 12 V | 13 V | 14 V | 15 V |
| VDD | 11 V | 12 V | 13 V | 14 V | 15 V | 16 V | 17 V | 18 V |

In Table 1, when the detected voltage Vd is 0 V, the corresponding operating voltage VDD is 3 V. When the detected voltage Vd is 1 V, the corresponding operating voltage VDD is 4 V. When the detected voltage Vd is 15 V, the corresponding operating voltage VDD is 18 V. Table 1 can be stored in the control circuit 24 for being looked up.

For example, when the control circuit 24 recognizes that the detected voltage Vd is 0 V through the detection circuit 26, the control circuit 24 outputs the adjustment signal to the power module 20 after looking up the table, and the adjustment signal is used to control the power module 20 to adjust the supplied voltage VDD provided to the device power supply 22 to be 3 V.

When the control circuit 24 recognizes that the detected voltage Vd is 1 V through the detection circuit 26, the control circuit 24 outputs the adjustment signal to the power module 20 after looking up the table, and the adjustment signal is used to control the power module 20 to adjust the supplied voltage VDD provided to the device power supply 22 to be 4 V.

The detection result of another detected voltage Vd can be obtained by the same approach. That is, the control circuit 24 can effectively control the power dissipation of the device power supply 22 to be less than the predetermined power (e.g., being 3 W) by looking up the table. At the same time, through a cooperation of a heat dissipation design on the device power supply 22, the device power supply 22 can operate normally and stably whilst satisfying a high voltage output and a high current output.

Therefore, through a design of table 1, when the supplied voltage provided to the device to be tested 3 by the device power supply 22 switches from a first supplied voltage to a second supplied voltage, the control circuit 24 correspondingly outputs the adjustment signal that controls a switching of the operating voltage provided to the device power supply 24 by the power module 20 from a first operating voltage to a second operating voltage. When the supplied voltage provided to the device to be tested 3 by the device power supply 22 switches from the second supplied voltage to the first supplied voltage, the control circuit 24 correspondingly outputs the adjustment signal that controls the switching of the operating voltage from the second operating voltage to the first operating voltage, where the second supplied voltage is greater than the first supplied voltage, the second operating voltage is greater than the first operating voltage, and a difference between the first supplied voltage and the first operating voltage is the same as a difference between the second supplied voltage and the second operating voltage. Table 1 herein is used to illustrate how the control circuit 24 controls the operating voltage VDD outputted by the power module 20 by looking up the table. The voltages in table 1 are provided for illustration purposes only, and the present disclosure is not limited thereto.

Another Embodiment of the Adjustable Power Supply System

Figure 4:
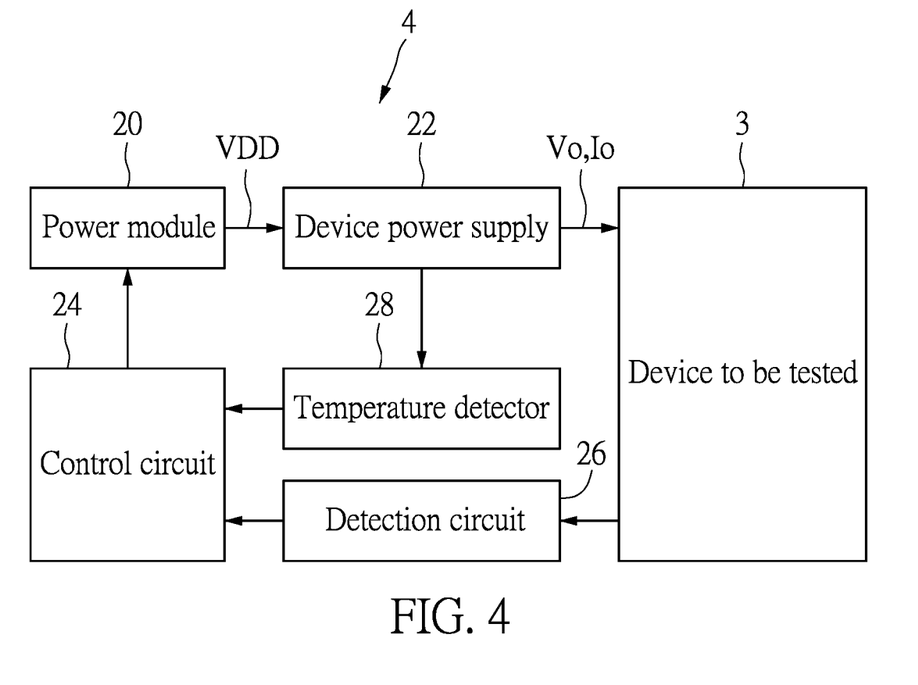
FIG. 4 is a functional block diagram of the adjustable power supply system according to another embodiment of the present disclosure.

Reference is made to FIG. 4, in which FIG. 4 is a functional block diagram of an adjustable power supply system according to another embodiment of the present disclosure. Compared with the adjustable power supply system 2 shown in FIG. 2, an adjustable power supply system 4 shown in FIG. 4 further includes a temperature detector 28. The temperature detector 28 is described herein. Regarding the functional operation of other components, reference can be made to the aforementioned description.

The temperature detector 28 is electrically connected to the device power supply 22 and the control circuit 24. The temperature detector 28 is used for detecting an operating temperature of the device power supply 22, and outputting a temperature detection result to the control circuit 24. When the control circuit 24 receives the temperature detection result of the temperature detector 28, the control circuit 24 can recognize the operating temperature of the device power supply 22, and further determine whether or not the operating temperature of the device power supply 22 is greater than a predetermined temperature.

When the operating temperature of the device power supply 22 is greater than the predetermined temperature, the control circuit 24 performs a cooling operation on the device power supply 22 through the power module 20. For example, the control circuit 24 can control the power module 20 to reduce the operating voltage provided to the device power supply 22, so that a cooling effect can be achieved in the device power supply 22 when the operating voltage is reduced. The operating voltage described herein is reduced, for example, 1 V at a time, but the present disclosure is not limited thereto.

Another Embodiment of the Adjustable Power Supply Method

Figure 5:
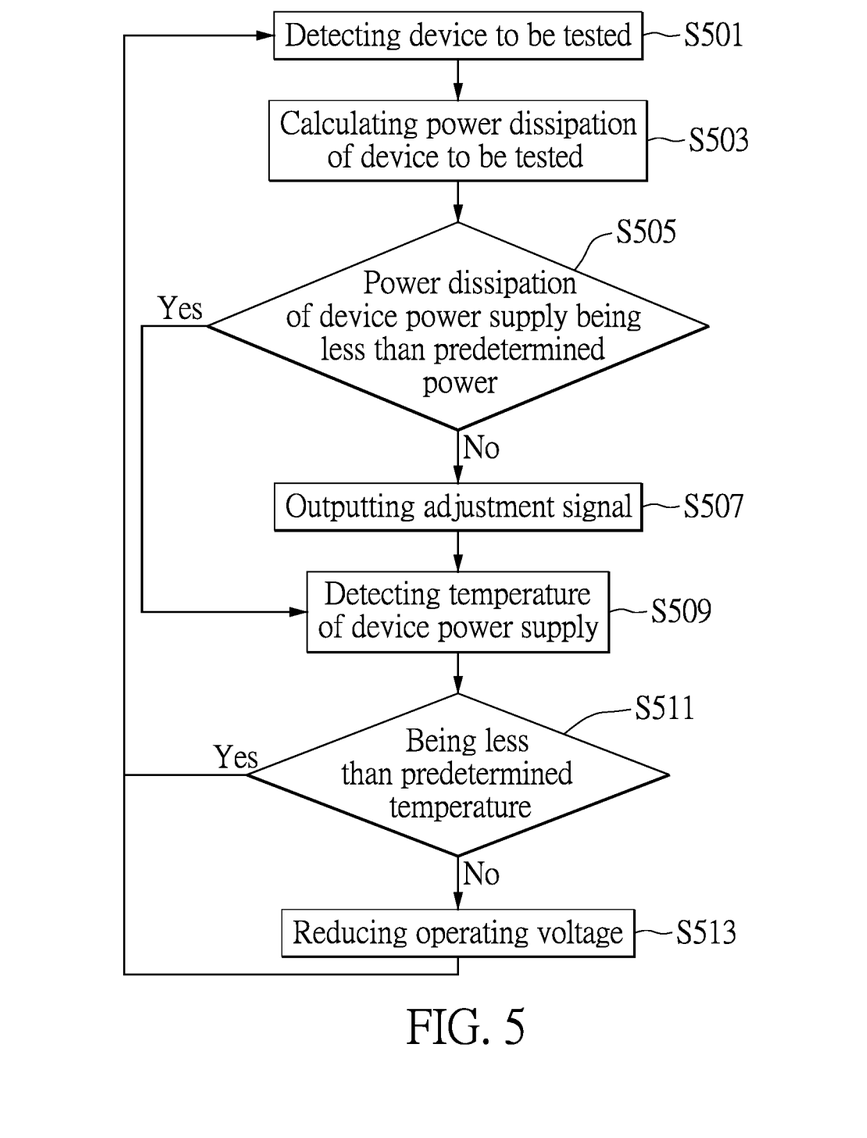
FIG. 5 is a flow chart of the adjustable power supply method according to another embodiment of the present disclosure.

Reference is made to FIG. 5, in which FIG. 5 is a flow chart of an adjustable power supply method according to another embodiment of the present disclosure. The flow chart shown in FIG. 5 is an example of the configuration of FIG. 4, but it is not limited thereto. The process shown in FIG. 5 includes the following steps.

Step S501: Detecting the device to be tested 3.

Step S503: Calculating the power dissipation of the device to be tested 3.

Step S505: Determining whether or not the power dissipation of the device power supply 22 is less than a predetermined power.

Step S507: Outputting an adjustment signal. When it is determined to be "No" in step S505, the control circuit 24 outputs the adjustment signal to the power module 20, so that the power module 20 adjusts the operating voltage VDD provided to the device power supply 22 according to the adjustment signal. When it is determined to be "Yes" in step S505, the process proceeds to step S509.

Step S509: Detecting a temperature of the device power supply 22. The control circuit 24 detects the temperature of the device power supply 22 through the temperature detector 28.

Step S511: Determining whether or not an operating temperature of the device power supply 22 is less than a predetermined temperature. The control circuit 24 can obtain the operating temperature of the device power supply 22 according to a detection result of step S509, and compare the operating temperature with the predetermined temperature.

Step S513: Reducing the operating voltage. When it is determined to be "No" in step S511, which indicates that the operating temperature of the device power supply 22 is currently greater than the predetermined temperature, the control circuit 24 performs a cooling operation on the device power supply 22. For example, the control circuit 24 controls the power module 20 to reduce the operating voltage VDD, so that the operating temperature of the device power supply 22 can be reduced accordingly.

When it is determined to be "Yes" in step S511, the process proceeds to step S501.

In one embodiment, the control circuit 24 can be, for example, one of an application specific integrated circuit (ASIC), a field programmable gate array (FPGA), a system on a chip (SOC), or any combination thereof, and can be used with related circuit components and firmware to achieve the above-mentioned functional operation.

Beneficial Effects of the Embodiments

In conclusion, the power adjustment circuit, the adjustable power supply system and the adjustable power supply method provided by the present disclosure can actively detect the power consumption status of the device to be tested, and adjust the operating voltage output by the power module accordingly, so that the power dissipation of the device power supply can be controlled within the predetermined power. Therefore, the device power supply can provide a high voltage output, a high current output, or other power outputs to different devices to be tested according to power requirements of the different devices to be tested. In addition, the device power supply can operate stably and normally, and a burden of heat dissipation can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adjustable power supply system, comprising:
a power module providing an operating voltage;
a device power supply electrically connected to the power module, the device power supply performing a power supply operation and providing a supplied power to a device to be tested according to the operating voltage; and
a control circuit, wherein the control circuit outputs an adjustment signal to control the power module according to a power consumption status of the device to be tested, so that the power module generates the operating voltage according to the adjustment signal, and the device power supply generates a first power dissipation that is less than a predetermined power.

2. The adjustable power supply system according to claim 1, further comprising a detection circuit electrically connected to the control circuit, the detection circuit detecting the power consumption status of the device to be tested and outputting a power detection result to the control circuit.

3. The adjustable power supply system according to claim 2, wherein the control circuit calculates and obtains a second power dissipation of the device to be tested and the first power dissipation of the device power supply according to the power detection result, and the control circuit outputs the adjustment signal when the first power dissipation is greater than the predetermined power; wherein the detection circuit is a voltage detector or a current detector.

4. The adjustable power supply system according to claim 2, wherein the adjustment signal adjusts the operating voltage provided to the device power supply by the power module to be higher or lower, such that the first power dissipation is less than the predetermined power; wherein the supplied power provided by the device power supply includes a supplied voltage and a supplied current.

5. The adjustable power supply system according to claim 4, wherein, when the device power supply provides the fixed supplied current to the device to be tested, and when the supplied voltage provided to the device to be tested by the device power supply switches from a first supplied voltage to a second supplied voltage, the control circuit correspondingly outputs the adjustment signal that controls switching of the operating voltage provided to the device power supply by the power module from a first operating voltage to a second operating voltage; wherein, when the supplied voltage provided to the device to be tested by the device power supply switches from the second supplied voltage to the first supplied voltage, the control circuit correspondingly outputs the adjustment signal that controls the switching of the operating voltage provided to the device power supply by the power module from the second operating voltage to the first operating voltage; wherein the second supplied voltage is greater than the first supplied voltage, and the second operating voltage is greater than the first operating voltage.

6. The adjustable power supply system according to claim 5, wherein a difference between the first supplied voltage and the first operating voltage is the same as a difference between the second supplied voltage and the second operating voltage.

7. The adjustable power supply system according to claim 1, further comprising a temperature detector electrically connected the control circuit, the control circuit controlling the power module to reduce the operating voltage when the temperature detector detects that a temperature of the device power supply is greater than a predetermined temperature.

8. A power adjustment circuit for power control of a power module and a device power supply, wherein the power module provides an operating voltage to the device power supply, and the device power supply performs a power supply operation and provides a supplied power to a device to be tested according to the operating voltage, the power adjustment circuit comprising:
a detection circuit detecting a power consumption status of the device to be tested and outputting a power detection result; and
a control circuit electrically connected to the detection circuit, the control circuit outputting an adjustment signal to the power module according to the power detection result, so that the power module generates the operating voltage according to the adjustment signal, and the device power supply generates a first power dissipation that is less than a predetermined power;

wherein the control circuit calculates and obtains a second power dissipation of the device to be tested and the first power dissipation of the device power supply according to the power detection result, and the control circuit outputs the adjustment signal when the first power dissipation is greater than the predetermined power.

9. The power adjustment circuit according claim 8, wherein the adjustment signal adjusts the operating voltage provided to the device power supply by the power module to be higher or lower, such that the first power dissipation is less than the predetermined power.

10. The power adjustment circuit according claim 8, further comprising a temperature detector electrically connected to the control circuit, the control circuit controlling the power module to reduce the operating voltage when the temperature detector detects that a temperature of the device power supply is greater than a predetermined temperature.

11. An adjustable power supply method for power control of a power module and a device power supply by a control circuit, comprising:

detecting a power consumption status of the device to be tested by the control circuit when the device power supply provides a supplied power to the device to be tested, wherein the device power supply performs a power supply operation according to an operating voltage provided by the power module; and outputting an adjustment signal to the power module by the control circuit according to a detection result, so that the power module generates the operating voltage according to the adjustment signal, and the device power supply generates a first power dissipation that is less than a predetermined power.

12. The adjustable power supply method according to claim 11, wherein the control circuit calculates and obtains a second power dissipation of the device to be tested and the first power dissipation of the device power supply according to the detection result, and the control circuit outputs the adjustment signal when the first power dissipation is greater than the predetermined power.

13. The adjustable power supply method according to claim 11, wherein the adjustment signal adjusts the operating voltage provided to the device power supply by the power module to be higher or lower, such that the first power dissipation is less than the predetermined power; wherein the supplied power provided by the device power supply includes a supplied voltage and a supplied current.

14. The adjustable power supply method according to claim 13, wherein, when the device power supply provides the fixed supplied current to the device to be tested, and when the supplied voltage provided to the device to be tested by the device power supply switches from a first supplied voltage to a second supplied voltage, the control circuit correspondingly outputs the adjustment signal that controls switching of the operating voltage provided to the device power supply by the power module from a first operating voltage to a second operating voltage; wherein, when the supplied voltage provided to the device to be tested by the device power supply switches from the second supplied voltage to the first supplied voltage, the control circuit correspondingly outputs the adjustment signal that controls the switching of the operating voltage provided to the device power supply by the power module from the second operating voltage to the first operating voltage; wherein the second supplied voltage is greater than the first supplied voltage, and the second operating voltage is greater than the first operating voltage.

15. The adjustable power supply method according to claim 14, wherein a difference between the first supplied voltage and the first operating voltage is the same as a difference between the second supplied voltage and the second operating voltage.

16. The adjustable power supply method according to claim 11, further comprising:

detecting a temperature of the device power supply; and controlling the power module by the control circuit to reduce the operating voltage when the temperature of the device power supply is greater than a predetermined temperature.

\* \* \* \* \*